(12) United States Patent
Manuilov et al.

(10) Patent No.: US 12,365,605 B2
(45) Date of Patent: Jul. 22, 2025

(54) DEVICE FOR PRODUCING DISINFECTANT SOLUTION, AND METHODS THEREFOR

(71) Applicant: IOON TECH INC, Dover, DE (US)

(72) Inventors: Andrii Mykhajlovych Manuilov, Kharkov (UA); Artur Viktorovych Martynov, Kharkov (UA); Mykhailo Borysovych Manuilov, Kharkov (UA); Feras Mousilli, Houston, TX (US)

(73) Assignee: IOON Tech Inc, Dover, DE (US)

( * ) Notice: Subject to any disclaimer, the term of this patent is extended or adjusted under 35 U.S.C. 154(b) by 114 days.

(21) Appl. No.: 17/633,939

(22) PCT Filed: Aug. 5, 2020

(86) PCT No.: PCT/UA2020/000080
§ 371 (c)(1),
(2) Date: Feb. 8, 2022

(87) PCT Pub. No.: WO2022/031256
PCT Pub. Date: Feb. 10, 2022

(65) Prior Publication Data
US 2022/0274853 A1    Sep. 1, 2022

(51) Int. Cl.
*C02F 1/36* (2023.01)
*C02F 1/467* (2023.01)
*C25B 9/17* (2021.01)

(52) U.S. Cl.
CPC ............ *C02F 1/36* (2013.01); *C02F 1/467* (2013.01); *C25B 9/17* (2021.01)

(58) Field of Classification Search
CPC ...... C02F 1/36; C02F 1/42; C02F 1/46; C02F 1/72; C25B 9/17
See application file for complete search history.

(56) References Cited

U.S. PATENT DOCUMENTS

| | | |
|---|---|---|
| 5,783,090 A | 7/1998 | Gleen |
| 2007/0026087 A1 | 3/2007 | Sugiura |
| 2010/0147700 A1 | 6/2010 | Field et al. |

FOREIGN PATENT DOCUMENTS

| | | | |
|---|---|---|---|
| CN | 111334815 A | * | 6/2020 |
| GE | 6044 B | | 2/2014 |

(Continued)

OTHER PUBLICATIONS

CN-111334815-A-translation (Year: 2020).*

(Continued)

*Primary Examiner* — Magali P Slawski
*Assistant Examiner* — Bernadette Karen McGann
(74) *Attorney, Agent, or Firm* — Lloyd & Mousilli; Benjamin M. Hanrahan

(57) ABSTRACT

A device for generating a disinfectant solution based on metal and water atoms, including at least one sealable enclosure, where at least one electrode is installed. The sealable enclosure further includes an inlet and an outlet. The device also includes an energy source that may be in contact with the fluid, or may be insulated from the fluid. Thus, the energy source may be made available inside the sealable enclosure or on the outside the sealable enclosure, or both. The device enables the rapid production of a disinfectant solution based on a mixture of fluid such as water and biocidal metal atoms such as silver atoms with increased antibacterial, virucidal and fungicidal properties.

20 Claims, 2 Drawing Sheets

(56) References Cited

FOREIGN PATENT DOCUMENTS

| KR | 20150005010 A | 1/2015 | | |
|---|---|---|---|---|
| RU | 2135417 C1 | 8/1999 | | |
| RU | 2537624 C2 | 1/2015 | | |
| UA | 116045 C2 | 11/2017 | | |
| UA | 123374 U | 2/2018 | | |
| UA | 135587 U | 7/2019 | | |
| WO | WO-03059823 A1 * | 7/2003 | ................ | C02F 1/36 |
| WO | 2017186980 A1 | 11/2017 | | |

OTHER PUBLICATIONS

Lv X. et al., Inhibitory effect of silver nanomaterials on transmissible virus-induced host cell infections, Biomaterials, 2014, vol. 35, No. 13, pp. 4195-4203.

Bright K. R. et al., Assessment of the antiviral properties of zeolites containing metal ions, Food and Environmental Virology, 2009, vol. 1, No. 1, p. 37.

Hirano N., Nakayama T., Virucidal effect of a newly developed nickel alloy on mouse coronavirus, The Nidoviruses, Springer, Boston, MA, 2006, pp. 601-603.

Silvestry-Rodriguez N. et al., Silver as a disinfectant, Reviews of environmental contamination and toxicology, Springer, New York, NY, 2007, pp. 23-45.

\* cited by examiner

DEVICE FOR PRODUCING DISINFECTANT SOLUTION, AND METHODS THEREFOR

CROSS-REFERENCE TO RELATED APPLICATIONS

This patent application is a U.S. national stage application of, and claims the benefit of, International PCT Application number PCT/UA2020/000080 filed on Aug. 5, 2020, which is incorporated herein by reference.

TECHNICAL FIELD

The present disclosure relates to devices and methods for producing disinfectant solutions in situ, and devices and methods for decontaminating surfaces.

BACKGROUND

The state of the environment is constantly deteriorating in recent years. Also, the need to combat pathogens of dangerous infectious diseases has increased, especially in the field population clusters: public transport, shops, hospitals, suburban tourist bases, children's summer camps, etc. Infection can be transmitted through the environment, including any surface of objects: door handles, handrails, walls and other various objects and equipment. In addition, the ever-growing demand of the population for quality drinking water creates the problem of providing consumers with environmentally friendly drinking water as it directly affects their health. Thus, disinfection from pathogenic microorganisms of liquid media, mainly water, as well as any surface is becoming an increasingly serious social problem.

Many devices treat liquids (drinking water or other liquids) for the purpose of disinfection from pathogenic microorganisms both in the home and in industry. One technique for disinfection involves the use of ultraviolet radiation. However, UV radiation use is limited to inanimate objects as it is harmful to tissue. Another method uses silver ions, which requires electrolysis of electrodes containing silver. The resulting silver ions have excellent antivirus properties as disclosed in, for example US20070026087A1 and WO2017186980 can also induce antivirus properties to other components such as zeolites. However, electrolysis based devices tend to be bulky and hence not portable. Further, electrolysis is less efficient than other techniques, as the operation is energy intensive. Moreover, electrolysis based devices are not conducive for use in water bodies with large volumes, or water bodies with intense vortex flows such as fountains or whirlpools.

Therefore, there is a dire need for a device that is portable, less energy intensive, high efficiency, and be versatile to be used for a wide variety of applications.

SUMMARY

Certain embodiments disclosed herein include a device for producing a disinfectant solution. The device includes a sealable enclosure that includes an electrode assembly. The sealable enclosure includes an inlet and an outlet that allows for a fluid to flow into the enclosure. In one embodiment, the electrode assembly includes at least one pair of electrodes, namely an anode and a cathode. In another embodiment, the electrode assembly includes a central anode, a cathode and an outer anode, wherein the central anode, the cathode and the outer anode are concentrically positioned spaced apart from each other. The electrodes may be made of any biocidal metal such as silver, copper, nickel, and the like, alloys of biocidal metals, other materials coated with biocidal metals, conductive carbon or other suitable materials, and combinations thereof. The device of the embodiments further includes an energy source that is located on the inside or the outside or both inside and outside the enclosure. The energy source may be insulated from the fluid. Energy sources may include a permanent magnet, an electromagnetic coil, an ultrasound wave generator, and the like, and combinations thereof. The inlet may further include a valve to control flow of the fluid, or a pump to pump the fluid into the enclosure, or both. The outlet may further include a spray attachment, or a pump to dispense the disinfectant fluid.

Certain embodiments disclosed herein also include a method for producing a disinfectant solution using the device as disclosed. The method includes flowing the fluid such as water into the sealable enclosure, and electrolysing the electrodes. Subsequently, either simultaneously with the electrolysing step or after a time lag from the start of the electrolysing, the energy source is turned on to energize the fluid and any metal ions or atoms that may be present in the fluid. The energizing step would break apart any fluid structure, as well as aid in the formation of metal atoms in place of the ions generated from the electrolysis step. This mixture of water and hydrogen atoms along with metal atoms forms the disinfectant solution, which is then dispelled through the outlet onto a surface or a liquid media to be disinfected.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
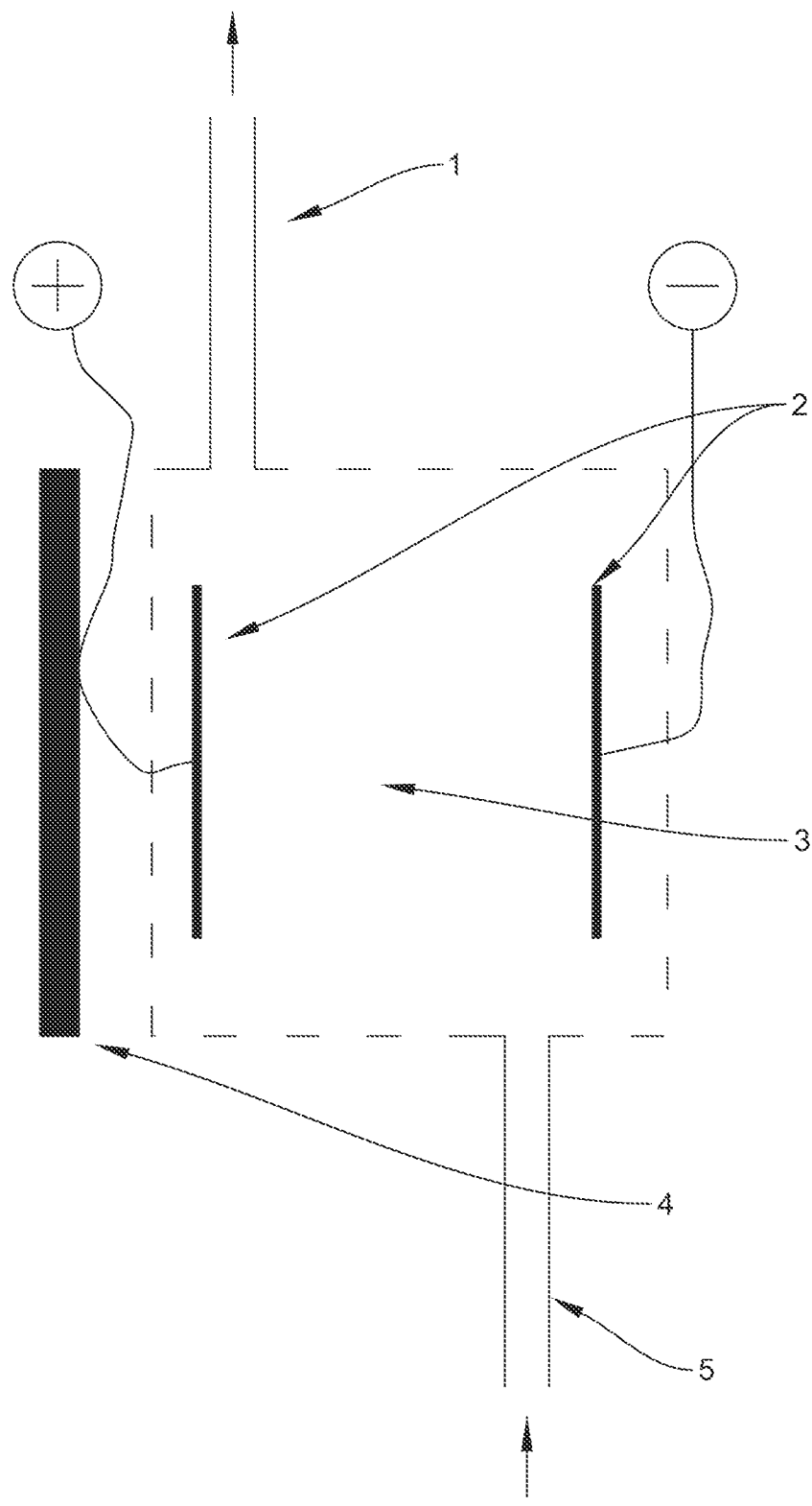
FIG. 1 is a schematic diagram of one exemplary embodiment of the device for generating a disinfectant, according to an embodiment.

The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the term "or" is generally employed in its sense including "and/or" unless the content clearly dictates otherwise.

In one embodiment a device for producing a fluid for disinfection is provided. The device includes a sealable enclosure including a sealable inlet that allows for filling the sealable enclosure with the fluid and a sealable outlet. The sealable enclosure also encloses an electrode assembly that includes at least one anode and at least one cathode. The device also includes an energy source that is made available inside the sealable enclosure, or on the outside of the sealable enclosure. In some embodiments, the energy source is made available both on the inside and the outside of the sealable enclosure. In other embodiments, the energy source is provided inside the sealable enclosure but it is situated such that it does not come into contact with the fluid by covering it with suitable means. The energy source may be a magnetic energy, an acoustic energy, an electromagnetic energy, electrical energy, and the like, and combinations thereof.

The inlet may further include a valve to control the flow of the fluid into the sealable enclosure. The outlet may also include a valve for the same purpose. Further, the outlet also includes a spray attachment that allows for the disinfectant fluid to be sprayed onto a surface that needs to be disinfected. It is noted that the spray attachment or other means of dispensing the fluid can be a removable attachment provided on the outlet that will allow for the device to become very versatile in its utility.

In another aspect, the embodiments provide a method for producing disinfectant solution using the device of the embodiments. The method includes filling the sealable enclosure of the device through the inlet with the fluid. The electrodes in the device are then electrolyzed to generate the metal ions from the electrodes. The method then involves generating energy from the energy source that will impinge the fluid containing the metal ions thus forming short-lived metal atoms and destabilizing water structure to produce the disinfectant solution. The disinfectant solution is then dispensed through the outlet of the device.

Fluid may be any liquid or gas or mixtures thereof that are used for disinfecting purposes. Examples of fluids that can be used in the device include, but not limited to: water; aqueous solutions, including, but not limited to, an aqueous solution of salts, acids, alkalis and bases, dyes, surfactants, cation exchangers, anion exchangers, alcohols, aldehydes, ketones, petroleum products, other aromatic and non-aromatic hydrocarbons, etc., and also mixtures thereof; aqueous solutions of disinfectants, virucides, insecticides, herbicides, fungicides, etc., as well as mixtures thereof; aqueous solutions of organic fertilizers; aqueous solutions of inorganic fertilizers; non-aqueous solutions, including, but not limited to, petroleum products, alcohols, other hydrocarbons, etc.

The device and the methods of the embodiments allow for the possibility of obtaining a disinfectant based on a mixture of water and metal atoms based on the metal used for the at least one cathode and at least one anode. The device of the embodiments allows for accelerated electrolysis, simplicity of mixing solutions and ease of dispensing the disinfectant mixture from within the device. This simultaneously increases antibacterial, virucidal and fungicidal properties, which expands the use of the device. For example, the device can be used to disinfect liquid media such as water, as well as any surface. Further, the device has added advantages such as simplification of design and production technology, reduced energy consumption, ensuring stability of work and extension of service life, reducing the cost of the device and its use.

Without being bound to any theory, the causal relationship between the essential features of the embodiments and the expected technical result is given herein.

The problem is solved by the fact that a set of electrodes are electrically connected to a DC power supply having an electrode polarity switch. The electrodes are of a certain composition and shape, which are completely immersed in the fluid medium inside the sealable enclosure. The electrodes are made of variable polarity, from one or different materials, mainly from biocidal metals. Some exemplary biocidal metals that can be used as the electrodes include silver, copper; alloys of silver and copper in a mass ratio ranging from about 1:999 to about 999:1. Other exemplary metals include nickel or zinc or zirconium. Further, the electrodes may be made of any conductive material based on carbon or of chemically inert metals and/or non-metals, including but not limited to metals such as gold, platinum, iridium or their alloy, or other conductive material which does not dissolve and does not oxidize during operation.

The electrolysis is conducted in the presence of a constant energy field that is induced by at least one energy source such as a magnetic field or acoustic energy, or combinations thereof. Without being bound to any theory, by completely immersing the electrodes in the liquid medium inside a suitably sized sealable enclosure under a constant energy source such as a magnetic field, highly active short-lived uncharged atoms (for example silver and copper from the electrodes and hydrogen from the water) are generated instead of weakly active ions of silver and copper (as in the devices disclosed in the prior art). The presence of an energy source such as a constant magnetic field in the electrolysis chamber can significantly reduce the voltage on the electrodes and increase the disinfectant properties of the resulting solution by magnetic stabilization of silver and copper atoms and prolong their lifetime. The disinfecting fluid made available from the device of the embodiments is most effective for disinfecting surface or other liquid media immediately after generating it. The absence of charged atoms allows them to penetrate deep into the microbial cell and exhibit disinfectant properties in much lower concentrations than ions. The antimicrobial efficiency of active atoms is three orders of magnitude higher, and the spectrum of disinfectant action is wider than that of silver and copper ions and colloidal solutions. The device of the embodiments allows for the treatment of the liquid media and surfaces with more active atoms of silver and copper. Thus, the device of the embodiments is vastly superior in its disinfecting capabilities as compared to conventional devices.

Besides destabilizing the structure of water, the energy source may also be used to clean the electrodes from oxides, which are the most common electrolysis byproducts. The disinfectant solution is made from ordinary water that is used as such, without the need for purifying it any further or softening it. As fluids like water have synergistic effects with metal atoms such as atomic silver, the resulting decontaminant solution is capable of near complete destruction of microorganisms, fungi and viruses on any surface.

EXAMPLES

Devices Based on Magnet as Energy Source

FIG. 1 shows a schematic diagram of one exemplary embodiment of the device of the embodiments that includes 1—outlet pipe, 2—electrode assembly, 3—sealable enclosure wherein the electrolysis occurs in the presence of the fluid by the electrodes, 4—source of a constant magnetic field such as a permanent magnet, and 5—inlet pipe. The inlet pipe 5 is used to supply water to the enclosure 3 that includes the electrode assembly 2 that include at least one pair of electrodes.

In the embodiment shown in FIG. 1 the electrode assembly 2 includes a pair of electrodes. The electrodes are made of alternating polarity and are electrically connected to a DC power supply with an electrode polarity switch. The electrodes can be made of one or different materials, preferably of biocidal metals, as well as be made in any shape. For example, the electrodes of the electrode assembly 2 can be made of silver or copper, or an alloy of silver and copper, in a mass ratio of metals from 1:999 to 999:1; or the electrode unit may contain a pair of electrodes one silver and one copper; or electrode block contains a pair of electrodes of which at least one electrode is made of nickel or zinc or zirconium; or the electrode unit contains at least one pair of electrodes that are made of any conductive material based on carbon or chemically inert metals and/or non-metals, including but not limited to such as gold, platinum, iridium or their alloy, or other conductive material that does not dissolve or oxidize during operation. The electrodes are completely immersed in the fluid that is fed into the sealable enclosure 3 through the inlet pipe 5.

In one embodiment, one may arrive at the exact location of the magnetic energy source. For example, a permanent magnet in the form of a repeating electrode, protected from contact with the liquid medium is located on the side of one of the electrodes; an electromagnetic coil, which is protected from contact with the liquid medium is installed on one side of the electrodes; two or more permanent magnets or two or more electromagnetic coils, or combinations thereof, which face the reactor chamber with the same poles to each other, are located on both sides of the electrodes, protected from contact with the liquid medium, and the permanent magnets are made in a repeating shape electrodes. In the embodiment shown in FIG. 1, the permanent magnet is located parallel to one of the electrodes and is also shaped similar to the shape of the electrode, thus providing a constant magnetic field inside the enclosure.

The outlet pipe 1 can be equipped with an additional device for spraying (not shown on fig.) to decontaminate surfaces, such as kitchen counters, tables, desks, chairs, hands, and the like. For disinfection of water in fountains, pools and other water tanks, the outlet is provided with a pumping mechanism to dispel the disinfectant solution. The DC power supply to which the electrodes of the unit 2 are electrically connected, can be made of any type (including in the form of a battery) and can have any location, can also be autonomous. If necessary, the device can be equipped with a control unit of any type, which can be located inside or outside the device, or made remotely. In general, the device may have a common body (not shown). Thus it can be seen that the device as disclosed for generating the disinfectant solution can be made portable, which makes it particularly convenient for use by consumers.

A device for generating a disinfectant solution having the following dimensions was built: a chamber with a volume of 3 cm$^3$ was used, the area of each electrode was 6 cm$^2$, the distance between the electrodes was 0.5 cm. These parameters include, but do not exclude the possible use of other sizes of the chamber, the area of the electrodes and the distances between them. Several pairs of electrodes or several successive solution processing chambers can also be used, in which copper electrodes may be installed in one independent chamber and silver electrodes in the other. Copper electrodes and silver-copper alloy electrodes can also be installed in different chambers.

The operational parameters of the device for generating the disinfectant solution are as follows: water was allowed to flow through the inlet pipe 5 at a rate of 1-50 ml/min/cm$^2$ of the area of the electrode assembly 2 to fill the sealable enclosure 3. The electric current for the electrode assembly 2 is supplied from a direct DC current having a frequency of 1-60 times per minute. Also, in the case of use of an electromagnetic coil instead of a permanent magnet as a source of the constant magnetic field, the coil is also supplied with electric current.

After filling the sealable enclosure 3, the liquid flow can also be temporarily blocked for 5-50 seconds to generate the required disinfectant concentration of uncharged atoms of silver, copper and hydrogen in the chamber. Then, the disinfectant solution is immediately ready to be used as a high efficiency disinfectant and is dispelled from the enclosure 3 through the outlet pipe 1 by means of dispelling onto a surface to be treated or introduced into the liquid to be treated.

For all experiments to study the disinfectant activity and the effectiveness of the device, the infected surface was prepared as follows: in a sterile Petri dish, a film of PET was placed and using a sterile cotton swab, one of the four test strains was smeared so as to cover the entire surface (63.5 cm$^2$). Polyethylene circles were applied to Petri dishes and 109 CFU/ml of relevant microorganisms was applied with a loop. The designation "CFU" means: CFU—a colony-forming unit—one living cell of a microorganism, which when sown on a solid nutrient medium is able to form a single colony of microorganisms that were accepted as sanitary-indicative microorganisms (according to the standards of identification of microorganisms—Order of the Ministry of Health of Ukraine N° 535 of 1985).

Experimental conditions: for control studies, 0.875 ml (seven spray injections) of disinfectant prepared using a general disinfectant preparation device, was applied to the infected with model strains PET film. For all the experiments conducted, the solution was generated for 60 seconds and the infected surface was sprayed with the received disinfectant solution. The results of the study of disinfectant activity and effectiveness of the claimed device are given below.

Example 1

The study of disinfectant activity of the device with two copper electrodes, the frequency of changes in the polarity of the current at the electrodes: once every 15 seconds with a direct current of 30 mA and a permanent magnet. The results of the experiment are presented in table 1.

TABLE 1

| The effectiveness of the disinfectant solution generated by the device with copper electrodes | | | | |
|---|---|---|---|---|
| | CFU/ml | | | |
| Strain | E. coli ATCC 25922 | S. aureus ATCC 25923 | C. albicans ATCC 885-653 | P. vulgaris ATCC 4636 |
| Control | 10$^9$ | 10$^9$ | 10$^9$ | 10$^9$ |
| Experiment | 10$^4$ | 10$^2$ | 0 | 10$^3$ |

As can be seen from table 1, disinfectant made from the device having only copper electrodes can reduce the CFU of

*C. albicans* almost completely. This is seen as the disinfectant solution being very effective towards this purpose.

Example 2

Study of disinfectant activity of the device with two electrodes from an alloy of silver and copper in a ratio 1:1, frequencies change of polarity of current on electrodes: once every 15 seconds with a direct current of 30 mA and with a constant magnet. The results of the experiment are presented in table 2.

TABLE 2

The effectiveness of the disinfectant solution generated by the device with electrodes from an alloy of silver and copper in a ratio 1:1

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control | $10^9$ | $10^9$ | $10^3$ | $10^9$ |
| Experiment | $10^2$ | $10^2$ | 0 | 0 |

As can be seen from table 2, disinfectant made from the device only with electrodes made of an alloy of copper and silver in a ratio of 1:1 are effective to reduce CFU of *C. albicans* and *P. Vulgaris* completely, and to reduce the number of *Escherichia coli* and staphylococcus to single colonies. Thus, a device with electrodes made of an alloy of silver and copper is the most effective for generating a disinfectant solution.

Example 3

Study of the disinfectant activity of a device with two electrodes made of an alloy of silver and copper in a ratio of 1:10, the frequency of change of polarity of the current at the electrodes: once every 15 seconds with a direct current of 30 mA and a permanent magnet. The results of the experiment are presented in table 3.

TABLE 3

The effectiveness of the disinfectant solution generated by the device with electrodes made of an alloy of silver and copper in a ratio of 1:10

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control | $10^9$ | $10^9$ | $10^9$ | $10^9$ |
| Experiment | $10^2$ | $10^3$ | 0 | 10 |

As can be seen from table 3, disinfectant made by the device having electrodes made of an alloy of copper and silver in a ratio of 1:10, significantly reduced the CFU of *C. albicans*, and *P. Vulgaris* to nil, while reducing the number of *Escherichia coli* and *staphylococcus* colonies to single colonies. Thus, a device with electrodes made of an alloy of silver and copper is effective for generating a disinfectant solution.

Example 4

Study of disinfectant activity of the device with two electrodes from an alloy of silver and copper in a ratio of 10:1, frequencies of change of polarity of current on electrodes: once every 15 seconds with a direct current of 30 mA and with a constant magnet. The results of the experiment are presented in table 4.

TABLE 4

The effectiveness of the disinfectant solution generated by the device with electrodes made of an alloy of silver and copper in a ratio of 10:1.

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control | $10^9$ | $10^9$ | $10^9$ | $10^9$ |
| Experiment | $10^2$ | $10^3$ | $10^0$ | 10 |

As can be seen from table 4, disinfectant made by the device only with electrodes made of an alloy of copper and silver in a ratio of 10:1 significantly reduced the CFU of microorganisms and is effective for generation of disinfectant solution.

Example 5

Study of the disinfectant activity of the device with two electrodes made of an alloy of silver and copper in a ratio of 99:1, the frequency of change of polarity of the current at the electrodes: once every 15 seconds with a direct current of 30 mA and a permanent magnet. The results of the experiment are presented in table 5.

TABLE 5

The effectiveness of the disinfectant solution generated by the device with electrodes made of an alloy of silver and copper in a ratio of 99:1

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control | $10^9$ | $10^9$ | $10^9$ | $10^9$ |
| Experiment | $10^2$ | $10^3$ | $10^2$ | $10^2$ |

As can be seen from table 5, the disinfectant made from the device having electrodes made of an alloy of copper and silver in a ratio of 99:1 significantly reduced the CFU of microorganisms and is thus very effective.

Example 6

Study of the disinfectant activity of a device with two electrodes made of an alloy of silver and copper in a ratio of 1:99, the frequency of change of polarity of the current at the electrodes: once every 15 seconds with a direct current of 30 mA and a permanent magnet. The results of the experiment are presented in table 6.

TABLE 6

The effectiveness of the disinfectant solution generated by the device with electrodes made of an alloy of silver and copper in a ratio of 1:99

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control | $10^9$ | $10^9$ | $10^3$ | $10^9$ |
| Experiment | $10^2$ | $10^3$ | 0 | 10 |

As can be seen from table 6, the disinfectant made from a device having electrodes consisting of an alloy of copper and silver in a ratio of 1:99 significantly reduced the CFU of microorganisms. Thus, a device with electrodes made of an alloy of silver and copper is effective for generating a disinfectant solution.

Example 7

Study of the disinfectant activity of a device with two silver electrodes and one permanent magnet, the frequency of change of polarity of the current at the electrodes: once every 15 seconds with a direct current of 30 mA and with one permanent magnet mounted parallel to the electrode. Results of the experiment are presented in table 7.

TABLE 7

The effectiveness of the disinfectant solution generated by the device with two silver electrodes and one permanent magnet

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control | $10^9$ | $10^9$ | $10^9$ | $10^9$ |
| Experiment | $10^3$ | $10^2$ | 10 | $10^2$ |

As can be seen from table 7, the disinfectant made by the device with silver electrodes and one permanent magnet significantly reduced the CFU of microorganisms.

Example 8

Study of disinfectant activity of the solution generated with two silver electrodes and processing time, frequencies of current polarity at the electrodes: once 15 seconds with a direct current of 3 Ohm A and with one permanent magnet installed in parallel with one of the electrodes. For all modes of the device, the sealed chamber was collected completely, the solution was generated for 60 seconds and the infected surface was sprayed with the solution immediately, and 10 sec, 30 sec, 60 sec, 120 sec and 240 sec after the solution was generated. The results of the experiment are presented in table 8

TABLE 8

The effectiveness of the disinfectant solution generated by the device with two silver electrodes and processing time

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control without processing | $10^9$ | $10^9$ | $10^9$ | $10^9$ |
| Experiment 0.01% *(at once) | $10^2$ | 10 | $10^2$ | $10^2$ |
| 10 sec | $10^3$ | $10^3$ | $10^5$ | $10^4$ |
| 30 sec | $10^4$ | $10^3$ | $10^4$ | $10^4$ |
| 60 sec | $10^3$ | $10^3$ | $10^4$ | $10^5$ |
| 120 sec | $10^6$ | $10^7$ | $10^6$ | $10^6$ |
| 240 sec | $10^9$ | $10^9$ | $10^9$ | $10^9$ |

*equivalent conversion to the concentration of silver generated in a solution established using an atomic emission spectrometer.

As can be seen from table 8, when treating the infected surface immediately after the generation of the solution or up to 120 seconds after the generation of the solution, the disinfectant solution remains highly active and reduces the load of microorganisms from 2 to 6 orders of magnitude. After 120 seconds after generating the solution, it loses its disinfectant properties.

Example 9

Study of disinfectant activity of a device with a zirconium electrode (a device with two electrodes, one of which is zirconium, the other is made of stainless steel), frequencies of current polarity at the electrodes: once every 15 seconds with a direct current of 30 mA and a permanent magnet. The results of the experiment are presented in table 9.

TABLE 9

The effectiveness of the disinfectant solution generated by the device with a zirconium electrode

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control | $10^9$ | $10^9$ | $10^9$ | $10^9$ |
| Experiment | $10^2$ | $10^2$ | 10 | $10^2$ |

As can be seen from table 9, disinfectant made from the device having one zirconium and one steel electrode reduces the CFU of the studied microorganisms to the number of traces—single colonies. Thus, a device with a zirconium electrode is also effective for generating a disinfectant solution.

Example 10

Study of disinfectant activity of a device with a zinc electrode (a device with two electrodes, one of which is zinc, the other made of stainless steel), frequencies of current polarity at the electrodes: once every 15 seconds with a direct current of 30 mA and a permanent magnet. The results of the experiment are presented in table 10.

TABLE 10

The effectiveness of the disinfectant solution
generated by the device with a zinc electrode

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control | $10^9$ | $10^9$ | $10^9$ | $10^9$ |
| Experiment | $10^3$ | $10^3$ | $10^2$ | $10^3$ |

As can be seen from table 10, the disinfectant made by the device with one zinc and one steel electrode reduces the CFU of the studied microorganisms by 2-3 times compared to the control. Thus, the device with a zinc electrode is also effective for generating disinfectant solutions.

Example 11

Study of the disinfectant activity of a device with a nickel electrode (a device with two electrodes, one of which is nickel and the other is made of stainless steel), the frequency of change polarity of current on electrodes: once every 15 seconds with a direct current of 30 mA and with a constant magnet. The results of the experiment are presented in table 11.

TABLE 11

The effectiveness of the disinfectant solution
generated by the device with a nickel electrode

| | CFU/ml | | | |
|---|---|---|---|---|
| Strain | E. coli ATCC 25922 | S. aureus ATCC 25923 | C. albicans ATCC 885-653 | P. vulgaris ATCC 4636 |
| Control | $10^9$ | $10^9$ | $10^9$ | $10^9$ |
| Experiment | $10^2$ | 0 | 0 | $10^2$ |

As can be seen from table 11, the use of a device with one nickel and one steel electrode reduces the CFU of the studied microorganisms in 3-4 times compared with the control, which also confirms the effectiveness of such a device for generating disinfectant solution.

Thus, the results of the study of the proposed device for generating a disinfectant solution confirmed the expected technical result, a positive effect and high efficiency. The device for generating disinfectant solutions can be widely used in various sectors of the economy and society.

Devices Using Ultrasonic Waves as Energy Source

Figure 2:
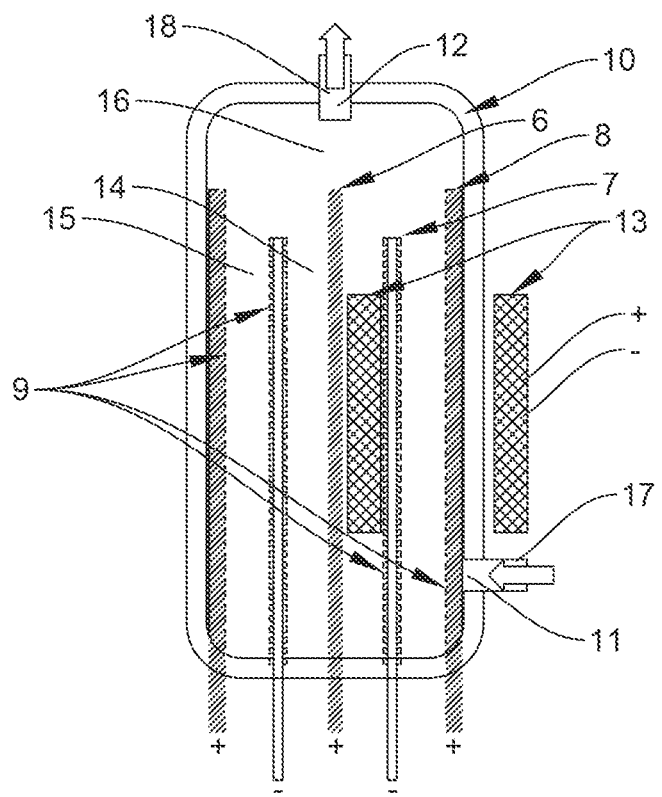
FIG. 2 is a schematic view of section side view of the device for generating a disinfectant, according to an embodiment.
Figure 3:
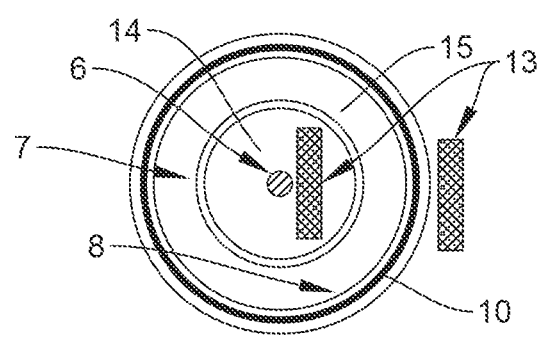
FIG. 3 is a schematic view of a sectional top view of the device for generating a disinfectant solution, according to an embodiment.

The design and principle of operation of the embodiment that uses ultrasonic waves as energy source is explained using the following images: FIG. 2—Schematic view of section side view of the inventive device for generating a disinfectant solution based on metal atoms and water in the embodiment. FIG. 3—Schematic view of a sectional top view of the claimed device for generating a disinfectant solution based on metal and water atoms in an embodiment.

In this embodiment, the device includes at least one central anode 6, a cathode 7 and an outer anode 8. The device then includes a sealable enclosure 9, which is an electrolyser that is sealed using a non-conductive material such as plastic. It can take any shape or form that renders it conducive for use. In one specific embodiment, it has a cylindrical shape. Sealable enclosure 9 is further equipped with a sealing valve (not shown), such as a reverse or other valve that does not allow water to drain out of the inlet 10. An outlet 11 is equipped with facilities for dispensing a disinfectant solution, such as an atomizer or sprayer. Inlet 10 may further be equipped with an intake pipe 12. Inside the enclosure 9, a cylindrical central anode 6 is made available. In one embodiment, the central anode 6 may be made of silver in the form of a longitudinally elongated rod. At a distance from the central anode 6, the cathode 7 is concentrically located to form the first electrolysis chamber 13. At a distance from the cathode 7, an outer anode 8 is concentrically installed to form the second electrolysis chamber 14, which in general constitutes the reactor zone of the sealable enclosure 9. In the upper part of the enclosure 9 above the electrodes, a cavity 15 is made in the form of an empty space, communicating with the outlet 11 and the electrolysis chambers 13, 14. The device includes an acoustic energy source 15, such as a sound wave generator, the components of which are installed in one of the variants inside the container between the central anode 6 and the cathode 7. This allows for the fluid inside the sealable enclosure 9 and the electrode assembly inside the sealable enclosure 9 to be impinged by the acoustic waves.

Cathode 7 is made of a metal, for example, copper, in the form of a hollow open cylinder, on the outer and inner surfaces of which a rhodium layer 16 is applied, covering the entire surface of the cathode 7. The outer anode 8 is made of metal, for example, copper, in the form of a hollow closed cylinder, on the inner surface of which a rhodium layer 16 is applied, covering the entire inner surface of the outer anode 8.

The inlet 10 may be an intake pipe equipped with a valve, through which fluid such as water enters the container 9 between the central anode 6, the cathode 7 and the outer anode 8. Output 17 can be equipped with an intake pipe 18.

The sealable enclosure 9 may be made with at least two isolated or interconnected chambers, in each of which at least the central anode 6, the cathode 7 and the outer anode 8 are arranged concentrically in the specific sequence.

In another embodiment, the inlet 10 includes a hermetic pump configured to pump a fluid to flow through the enclosure 9. The pump may also be used to dispense the disinfectant solution through the outlet 11.

In a specific embodiment, the central anode 6 is cylindrical having a diameter ranging from about 1 mm to about 10 mm, and a height ranging from about 10 mm to about 100 mm. The cathode 7 is present in the form of a metal cylinder with a height ranging from about 10 mm to about 100 mm. It is made of inert conductive material. The distance between the central anode 6 and the cathode 7 ranges from about 1 mm to about 20 mm. The voltage supplied to the central anode 6, the outer anode 8 and the cathode 7 ranges from about 3V to about 5 V.

Atomic silver is generated by dissolving the central anode 6, and in the other chamber 14, water is electrolyzed, and the solutions being output from both chambers are mixed in the cavity 15 and sprayed on the surface to be decontaminated.

The device as disclosed is quite compact and energy-saving. A typical battery may last over a year without charging as the power consumption is quite minimal. Also, the acoustic waves that are used to destabilize the structure of water molecules can also be used to clean the electrodes from oxides, thus prolonging the life of the device. The acoustic energy source 15 can be placed both inside the container 9 between the electrodes 6 and 7, and outside in contact with the container 9. The synergistic mixture obtained at the outlet has high antibacterial, virucidal and fungicidal properties, many times higher than that of colloidal silver.

Example 12

Design of a Device of the Embodiments that Uses Acoustic Waves as Energy Source In the experiments, a device as described herein was used, through which water was allowed to flow through the branch pipe 12 of inlet 10 at a speed of 0.2-6.0 cm/s to fill the sealable enclosure 9 optionally using a pump. An electric current is applied to the electrodes, with a voltage of 3-5 V, after filling the chamber 9 with constant flow of liquid by a pump or other pumping device. Central anode 6 is a silver cylinder or plate, and the cathode 7 and the outer anode 8 can be made either from platinum, iridium or their alloys, or from carbon or any metal coated with rhodium on the side of electrolysis chambers 13, 14. In the experiments, a sealable enclosure 9 having a volume 1-3 cm$^3$ was used. The area of each electrode was 2-6 cm$^2$, and the distance between the electrodes was 0.5-5 cm. During operation, the entire enclosure 9 and electrodes 6 and 7 were exposed to sound waves from a portable sound wave generator 15 with a frequency of 1.5 MHz to enhance the process of destabilizing the polymer structure of water and cleaning the electrodes from scaling. The sound wave generator 15 was located outside the enclosure 9. The power of the sound wave generator 15 was 3 W/h.

Example 13

Study of the Activity of the Device Depending on the Frequency of Changing the Polarity of the Current on the Electrodes In this example, two carbon electrodes were used. The frequencies of changing the polarity of the current on the electrodes was set at: once every second (mode 1); once every 5 seconds (mode 2), once every 15 seconds (mode 3); once every 30 seconds (mode 4); once every 60 seconds (mode 5). A constant current of 30 mA was used for the electrodes and a flow rate 3 cm/sec was maintained. At the inlet 10 into the sealable enclosure 9, the number of microorganisms in the water was determined (Control). The solution emerging from the chamber of container 5 was collected and inoculated onto solid nutrient media in a Petri dish, and the CFR/ml was determined. The experimental results are presented in table 12.

TABLE 12

Dependence of the efficiency of the device on the frequency of changing the polarity of the electrodes

| | CFU/ml | | | |
|---|---|---|---|---|
| Strain: | E. coli ATCC 25922 | S. aureus ATCC 25923 | C. albicans ATCC 885-653 | P. vulgaris ATCC 4636 |
| Control | 10$^9$ | 10$^9$ | 10$^9$ | 10$^9$ |
| Mode 1 | 10$^6$ | 10$^6$ | 10$^5$ | 10$^6$ |
| Mode 2 | 10$^2$ | 10$^2$ | 10$^2$ | 10$^1$-10$^2$ |
| Mode 3 | 10$^2$ | 10$^2$ | 10$^2$ | 10$^1$-10$^2$ |
| Mode 4 | 10$^2$ | 10$^2$ | 10$^2$ | 10$^1$-10$^2$ |
| Mode 5 | 10$^7$ | 10$^5$ | 10$^5$ | 10$^8$ |

As seen in table 12, when the polarity is reversed once per second and once every 60 seconds, the efficiency of the generated solution is significantly less than in the range from 1 to 60 times per minute.

Example 14

Study of Disinfectant Activity Depending on the Speed of the Laminar Flow of Water Through the Reactor Zone of the Container Chamber 5

In this experiment, while maintaining all other parameters same as that of Example 1, instead of a carbon cathode 7, an electrode made of an inert metal or alloy (gold, platinum, iridium, etc.) or a metal coated with rhodium or an aluminum electrode can be used, the entire enclosure 9 was also covered with aluminum from the inside. Moreover, for all modes of the claimed device, the flow through the reactor chamber of the enclosure 9 was laminar, and the liquid collected at the outlet was immediately introduced into a Petri dish with a nutrient medium with a bacteriological loop to determine the CFU/ml of microorganisms in comparison with the CFU/ml of bacteria at the entrance to the enclosure 9 (Control). The experimental results are presented in table 13.

TABLE 13

Dependence of the efficiency of disinfection of the solution on the speed of the laminar flow of water through the reactor zone of the container chamber 5

| | CFU/ml | | | |
|---|---|---|---|---|
| Strain: | E. coli ATCC 25922 | S. aureus ATCC 25923 | C. albicans ATCC 885-653 | P. vulgaris ATCC 4636 |
| Control | 10$^9$ | 10$^9$ | 10$^9$ | 10$^9$ |
| Mode 1 | 10$^9$ | 10$^9$ | 10$^9$ | 10$^9$ |
| Mode 2 | 10$^2$ | 10$^2$ | 10$^2$ | 10$^2$ |
| Mode 3 | 10$^2$ | 10$^2$ | 10$^2$ | 10$^1$-10$^2$ |
| Mode 4 | 10$^2$ | 10$^2$ | 10$^2$ | 10$^2$ |
| Mode 5 | 10$^9$ | 10$^8$ | 10$^8$ | 10$^8$ |

As can be seen in table 13, at a laminar flow rate of 9 cm/min (Mode 5), the generated solution did not actually differ in the number of living microorganisms from the incoming solution due to the fact that at such a flow rate between the electrodes there is practically no electric current and the device does not have time to act on microorganisms. At a speed of 0.5 cm/min (Mode 1) also, the differences between the incoming and outgoing solutions in terms of the number of live bacteria are minimal. Thus, the optimal effective flow rates through the reactor chamber are modes from 0.2 to 6.0 cm/sec.

Example 15

Study of the Virucidal Activity of the Claimed Device Using the Example of Different Bacteriophages Study of disinfectant activity was conducted on the device having a silver central anode 6 in the form of a rod and rhodium-plated cylindrical electrodes—cathode 7, and outer anode 8. In this case, for all modes, the sealable enclosure 9 was filled completely by flowing water through it at a speed of 3 cm/sec. To 1 ml phagolysate (10 log CFU/mL killed bacteria), 0.5 ml of the generated solution was added over a time period of 10 seconds. The number of living bacteriophages was determined in a classical way by plaque formation inhibition of the growth of sensitive bacteria in a solid nutrient medium compared with untreated control of phagolysate, to which 0.5 ml of physiological saline was added. The experimental results are presented in table 14.

TABLE 14

Virucidal efficacy of the device

| | % surviving bacteriophage | |
|---|---|---|
| Strain: | *P. aeruginosa* 66-16 | *S. aureus* ATCC 25923 |
| Control | 100 | 100 |
| experiment | 5 ± 1 | 6 ± 1 |

As can be seen from Table 14, the use of the device leads to a decrease in the number of live bacteriophages of different species by an average of 2 orders of magnitude. Thus, the proposed device has a virucidal effect and can effectively destroy viruses in a liquid medium.

Example 16

Study of Virucidal, Bactericidal and Fungicidal Activity of a Device for Disinfecting a Stream of Dusty Air In many cases, it is necessary to clean the air of viruses and microorganisms using non-reagent methods. For example, in infectious wards of hospitals, it is necessary to continuously purify the air from infectious agents without the use of chemical reagents or ultraviolet radiation. This is especially the case in most intensive care units in hospitals. The device of the embodiments has been demonstrated to be a very effective solution in this situation.

To study the proposed device, a dry mixture of the most common bacteria, fungi and viruses was to be used. Towards this, liquid nutrient media was prepared and incubated to contain after incubation 1010 CFU/ml *S. aureus* ATCC 25923, *C. Albicans* ATCC 885-653 and industrial pyobacteriophage. These were freeze-dried and ground into powder. Before use, the mixture was beaten to form a dust cloud in a 500 ml flask, into which, in the form of an aerosol, the disinfectant solution was introduced immediately after generation from the device. The control group had a sample (after being captured in a bacteriological trap-filter) at the entrance to the enclosure 9 (with a volume of 50 ml of air), prot-type—at the outlet 11 (Experiment 13). Another experiment was carried out with the device turned off (Experiment 14). The activity of the bacteriophage was determined by its ability to induce lysis zones (plaques) on a solid nutrient medium with *Pseudomonas aeruginosa* (% survival versus control). The results of the study of antimicrobial activity are shown in table 15.

TABLE 15

Efficiency of the device for disinfection of infected air

| | | CFU/ml | |
|---|---|---|---|
| Sample | Pyobacteriophage % | *S. aureus* ATCC 25923 | *C. albicans* ATCC 885-653 |
| Control | 100 | $10^9$ | $10^9$ |
| Experiment | 10 | $10^2$ | $10^2$ |
| Experiment 2 | 90 | $10^8$ | $10^8$ |

As can be seen from Table 15, the disinfectant solution from the device of the embodiments makes it possible to almost completely disinfect the infected air by immediately spraying the generated disinfectant, thereby reducing the viability of bacteria and fungi by 1 order of magnitude, and bacteriophages by 10%. There was a marked decrease in the concentration of both live *staphylococci* and *Candida fungi*, and viruses (pyobacteriophage).

Thus, it can be seen that the device as disclosed provides some key advantages that include simplicity of its design, rapid production technology, reduction of energy consumption, ensuring the stability of work and life extension, reducing the cost of the device and its use, etc. Further, it is also possible to clean the electrodes from electrolysis products using the acoustic energy source 15 increasing the longevity of the device. The device as disclosed enables the generation of a disinfectant solution within 1-60 seconds.

The device described herein equipped with the specified components, in addition to generating an disinfectant agent, can be also used for: desalination of water; demineralization of water; water purification from mechanical impurities; water purification from organic impurities; generating a hydrogen peroxide solution; generating a superoxide and/or hydrogen peroxide solution; generation of electrolytes, i.e. solutions that conduct electric current; generation of liquid components of fuel cells; generating modifiers, i.e. components that have a positive effect on performance, productivity, efficiency, environmental friendliness, cost, etc., for fuel cells; generation of liquid components of primary current sources; generation of modifiers for primary current sources; generation of liquid battery components; generating modifiers for batteries; fuel generation incl. based on petroleum products, alcohols, etc.; generation of fuel modifiers including based on petroleum products, alcohols, etc.; generation of fungicides; generation of fungicide modifiers; generation of herbicides; generation of herbicide modifiers; generation of acaricides; generation of modifiers of acaricides; generating insecticides; generating insecticide modifiers; generation of deratizers; generation of modifiers of deratizers; generation of zoocides; generating zoocide modifiers; preservation and accumulation of electric charge; transferring electric charge to the external circuit; The electrolysis-sound chamber of the container (cartridge) of the device can also be used to increase the effective capacity of batteries, capacitors, increase the stability of enzymes and drugs.

While only certain features of the embodiments have been illustrated and described herein, many modifications and changes will occur to those skilled in the art. It is, therefore, to be understood that the appended claims are intended to cover all such modifications and changes as fall within the true spirit of the embodiments.

The invention claimed is:

1. A device for producing a disinfectant fluid, the device comprising:
   at least one enclosure, each of the at least one enclosure comprising an electrode assembly that comprises:
      at least one cathode;
      a fluid inlet that allows a fluid to enter into the at least one enclosure;
      an energy source that is insulated from the fluid capable of imparting energy to at least one of the electrode assembly of the fluid;
      a fluid outlet that allows disinfecting fluid to exit the enclosure;
   wherein the electrode assembly comprises a central anode, a cathode, and an outer anode;

the central anode, the cathode, and the outer anode are concentrically arranged and positioned at a distance from each other;

the central anode is made in a form of a longitudinally elongated rod; at least an outer layer of which is made of silver;

the cathode is made at least partially open on one side; and the energy source is a sound wave generator.

2. The device of claim 1, wherein the energy source comprises at least one of a magnetic energy, acoustic energy, electrical energy, or electromagnetic energy.

3. The device of claim 1, wherein the fluid outlet further comprises a spray attachment.

4. The device of claim 1 further comprising at least two enclosures, each of the at least two enclosures comprising at least a central anode, a cathode, and an anode.

5. The device of claim 1 wherein each of the at least one enclosure has a cylindrical shape.

6. The device of claim 1 wherein the central anode, the cathode, and the outer anode, are cylindrical in shape.

7. The device of claim 1, wherein the at least one enclosure has a polyhedron shape.

8. The device of claim 1 wherein the central anode, the cathode, and the outer anode, have a polyhedron shape.

9. The device of claim 1 wherein the central anode is in a form of a plate.

10. The device of claim 1, wherein the fluid inlet, or the fluid outlet, or both are equipped with a valve.

11. The device of claim 1, further comprising:
a cavity for mixing; and
an outlet with a facility for releasing disinfectant solution that is made in an upper part of the at least one enclosure.

12. The device of claim 1 wherein the sound wave generator is located outside the at least one enclosure.

13. The device of claim 1 wherein the sound wave generator is located inside the at least one enclosure.

14. The device of claim 1 further comprising two sound wave generators, one of the two sound wave generators located outside the at least one enclosure, and a second of the two sound wave generators located inside the at least one enclosure.

15. The device of claim 1 wherein the sound wave generator is configured to generate sound waves having a frequency ranging from about 0.2 Hz to about 20 KHz.

16. The device of claim 1 wherein the sound wave generator is configured to generate sound waves having a frequency ranging from about 20 KHz to about 2.5 MHz.

17. The device of claim 1 wherein the sound wave generator is configured to generate sound waves having a frequency ranging from about 0.2 Hz to about 2.5 MHz.

18. The device of claim 1 wherein the enclosure is a sealable enclosure.

19. The device of claim 1 wherein the fluid inlet is a sealable fluid inlet.

20. The device of claim 1 wherein the fluid outlet is a sealable fluid outlet.

* * * * *